United States Patent
Gallandat

(10) Patent No.: US 12,228,247 B2
(45) Date of Patent: Feb. 18, 2025

(54) HYDROGEN STORAGE SYSTEM

(71) Applicant: GRZ TECHNOLOGIES SA, Avenches (CH)

(72) Inventor: Noris Gallandat, Schwarzsee (CH)

(73) Assignee: GRZ TECHNOLOGIES SA, Avenches (CH)

( * ) Notice: Subject to any disclaimer, the term of this patent is extended or adjusted under 35 U.S.C. 154(b) by 702 days.

(21) Appl. No.: 17/603,665

(22) PCT Filed: Apr. 7, 2020

(86) PCT No.: PCT/EP2020/059860
§ 371 (c)(1),
(2) Date: Oct. 14, 2021

(87) PCT Pub. No.: WO2020/212197
PCT Pub. Date: Oct. 22, 2020

(65) Prior Publication Data
US 2022/0299167 A1   Sep. 22, 2022

(30) Foreign Application Priority Data
Apr. 17, 2019  (EP) .................................... 19169845

(51) Int. Cl.
| F17C 11/00 | (2006.01) |
| F17C 13/02 | (2006.01) |
| H01M 8/065 | (2016.01) |

(52) U.S. Cl.
CPC .......... *F17C 11/005* (2013.01); *F17C 13/025* (2013.01); *F17C 13/026* (2013.01);
(Continued)

(58) Field of Classification Search
CPC .... F17C 11/005; F17C 13/025; F17C 13/026; F17C 2205/0326; F17C 2221/012;
(Continued)

(56) References Cited

U.S. PATENT DOCUMENTS

| 4,225,320 A | 9/1980 | Gell |
| 5,678,410 A | 10/1997 | Fujita |

(Continued)

FOREIGN PATENT DOCUMENTS

| FR | 3063333 | 8/2018 |
| JP | 2004-332757 | 11/2004 |

(Continued)

OTHER PUBLICATIONS

Machine-generated English translation of JP H04-270872 A, published Sep. 28, 1992 (Year: 1992).*
International Search Report and Written Opinion issued by the European Patent Office, dated Aug. 18, 2020, for International Patent Application No. PCT/EP2020/059860; 21 pages.

*Primary Examiner* — Frank M Lawrence, Jr.
(74) *Attorney, Agent, or Firm* — Faegre Drinker Biddle & Reath LLP

(57) ABSTRACT

Hydrogen storage system for passive discharge of hydrogen gas without employing heater, comprising a plurality of hydrogen storage tanks each containing at least one metal hydride (MH) storage material, a hydrogen gas flow circuit connected to the storage tanks and a control system including pressure sensors (P) and temperature sensors (T) arranged for measuring the pressure and temperature in each storage tank, the gas flow circuit comprising valves (V, V1, . . . Vn) coupling said plurality of storage tanks to an inlet, respectively an outlet of the hydrogen storage system, whereby the inlet and outlet may be common or may be separate. At least a first material storage tank comprises a first metal hydride (MH1) of a first composition and at least a second material storage tank comprises a second metal hydride (MH2) of a second composition.

25 Claims, 8 Drawing Sheets

(52) U.S. Cl.
CPC .......................... *F17C 2205/0326* (2013.01); *F17C 2221/012* (2013.01); *F17C 2250/043* (2013.01); *F17C 2250/0439* (2013.01)

(58) Field of Classification Search
CPC ........ F17C 2250/043; F17C 2250/0439; F17C 1/00; F17C 13/04; F17C 2205/0323; F17C 2250/0631; H01M 2250/20; H01M 8/04201; H01M 8/04216; Y02E 60/32; Y02E 60/50; Y02T 90/40
USPC ................ 96/108, 121, 112, 113; 423/658.2; 420/900; 206/7; 429/515
See application file for complete search history.

(56) References Cited

U.S. PATENT DOCUMENTS

| | | | |
|---|---|---|---|
| 2005/0003246 A1 | 1/2005 | Shimada | |
| 2008/0250804 A1* | 10/2008 | Kubo | F17C 5/007 165/44 |
| 2024/0117941 A1* | 4/2024 | Park | F17C 11/005 |
| 2024/0243326 A1* | 7/2024 | Leon | H01M 8/182 |

FOREIGN PATENT DOCUMENTS

| | | | |
|---|---|---|---|
| JP | 2011-052742 | | 3/2011 |
| JP | H04270872 A | * | 9/2024 |

* cited by examiner

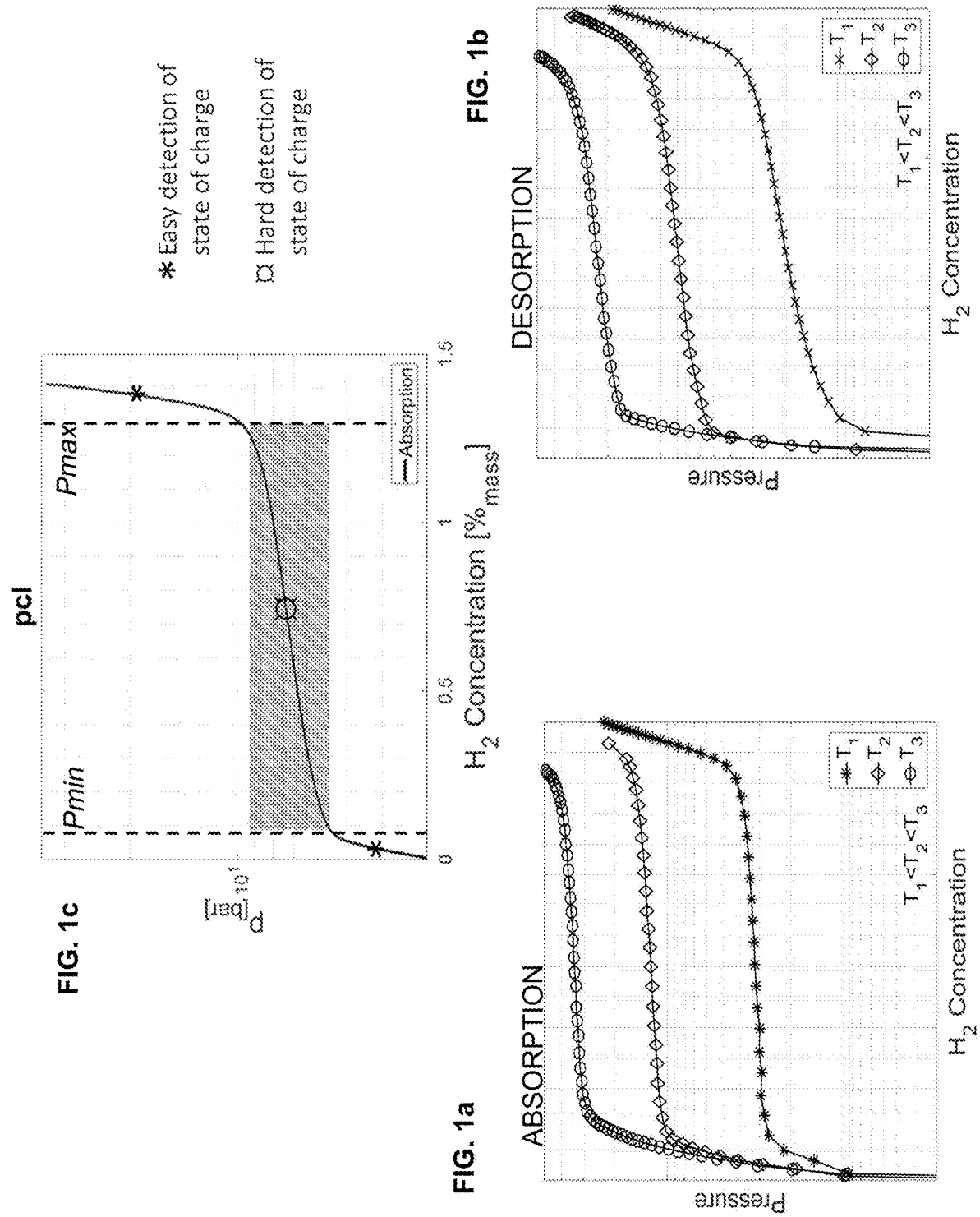

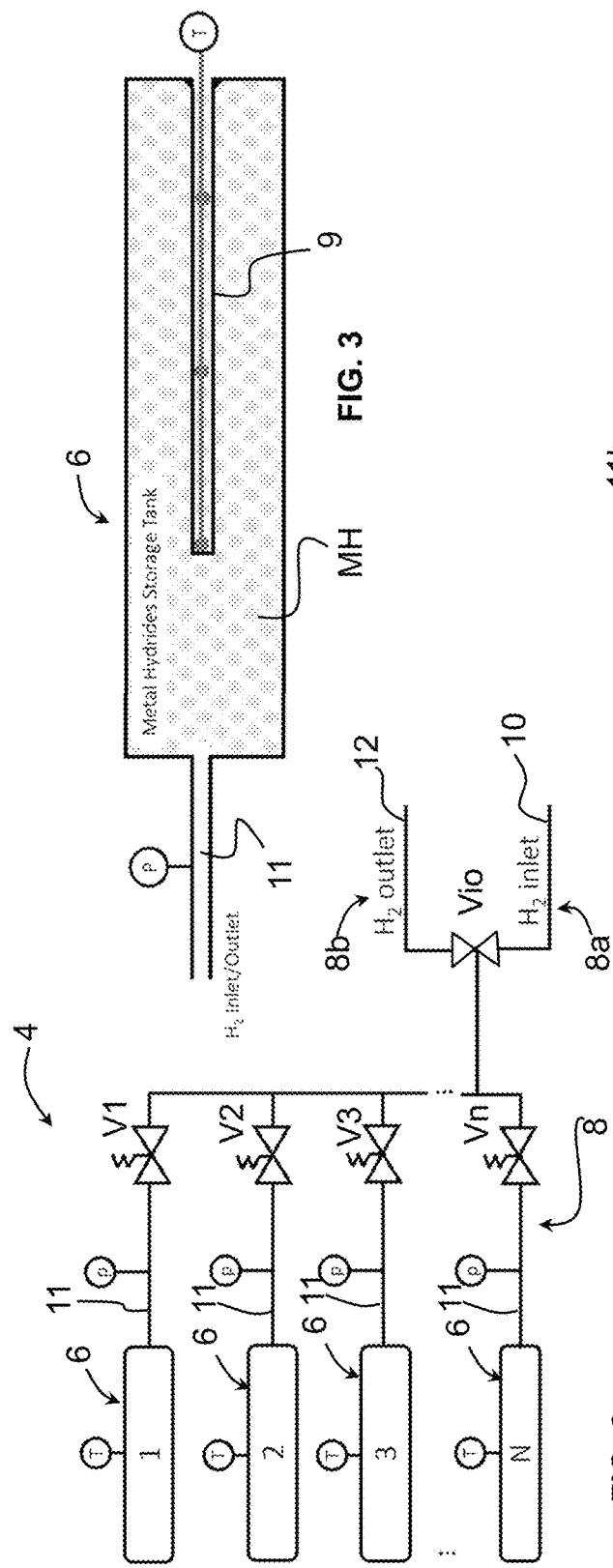
FIG. 3
FIG. 2
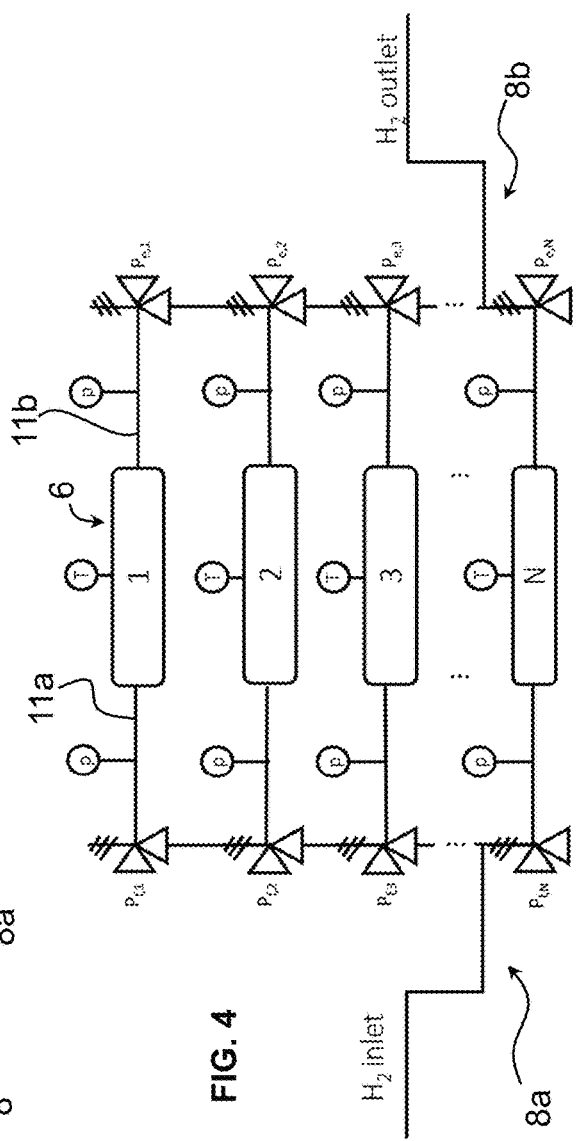
FIG. 4

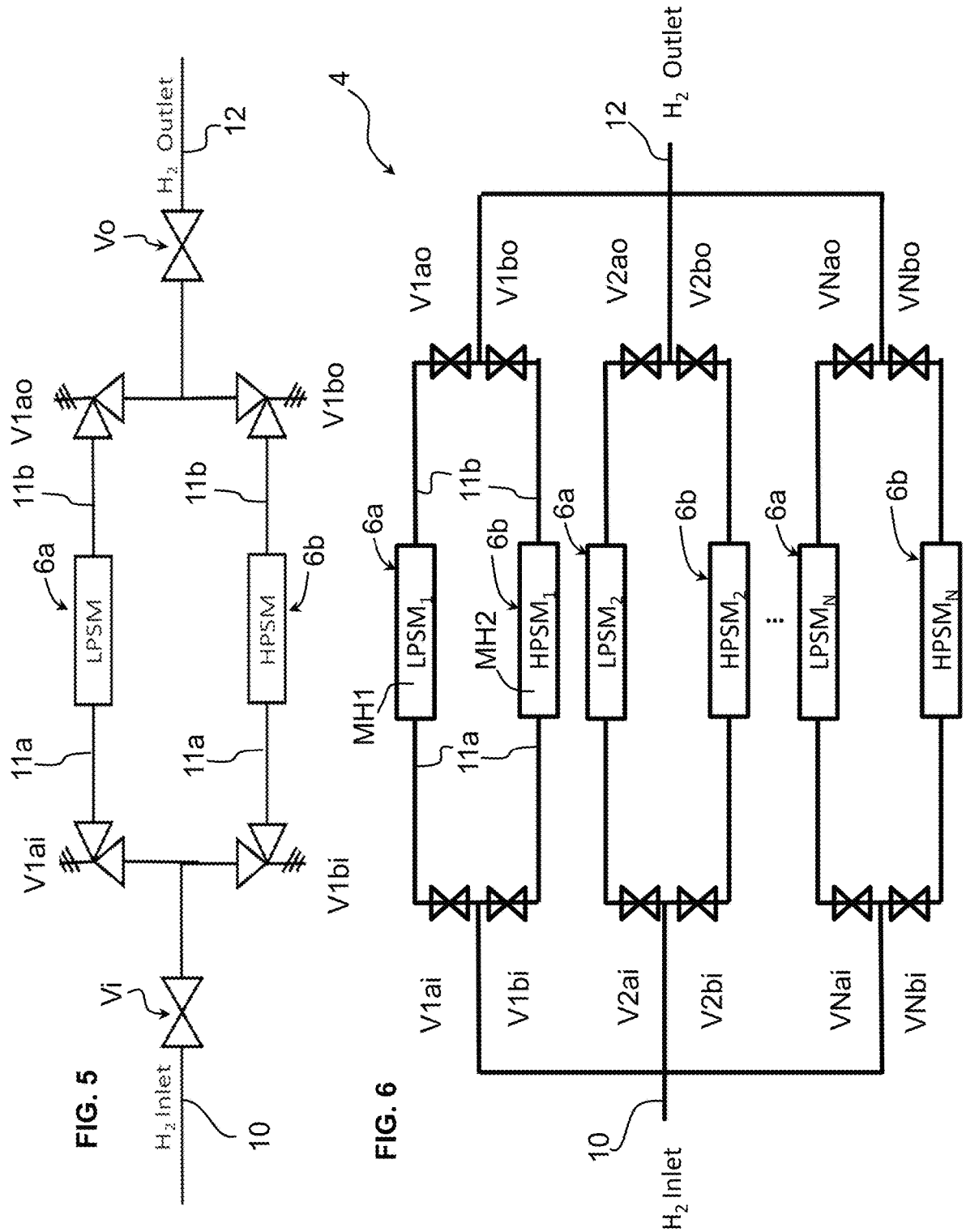

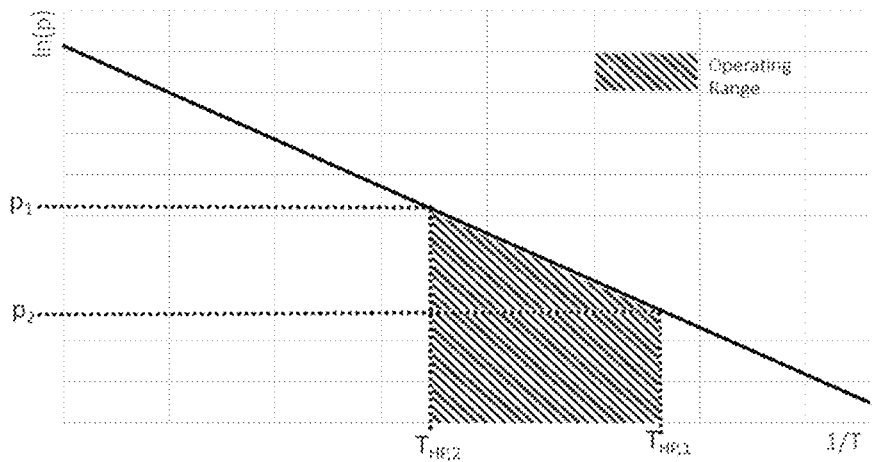
FIG. 7a  High Pressure Storage Material
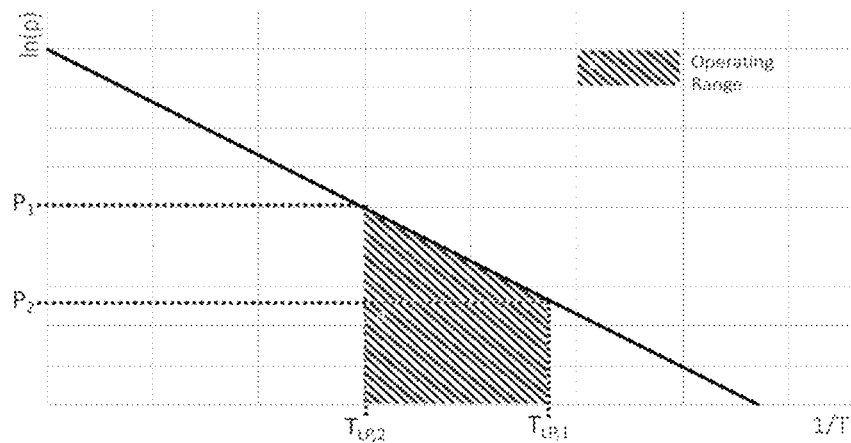
FIG. 7b  Low Pressure Storage Material
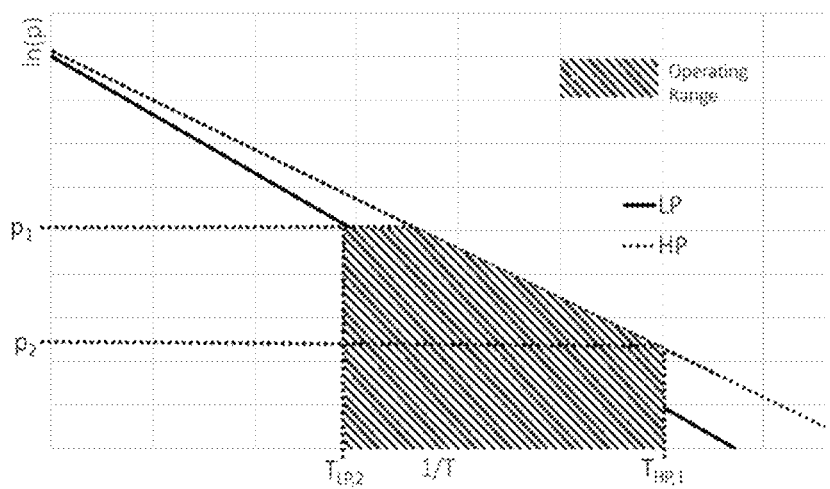
FIG. 7c  High Pressure and Low Pressure Storage Material

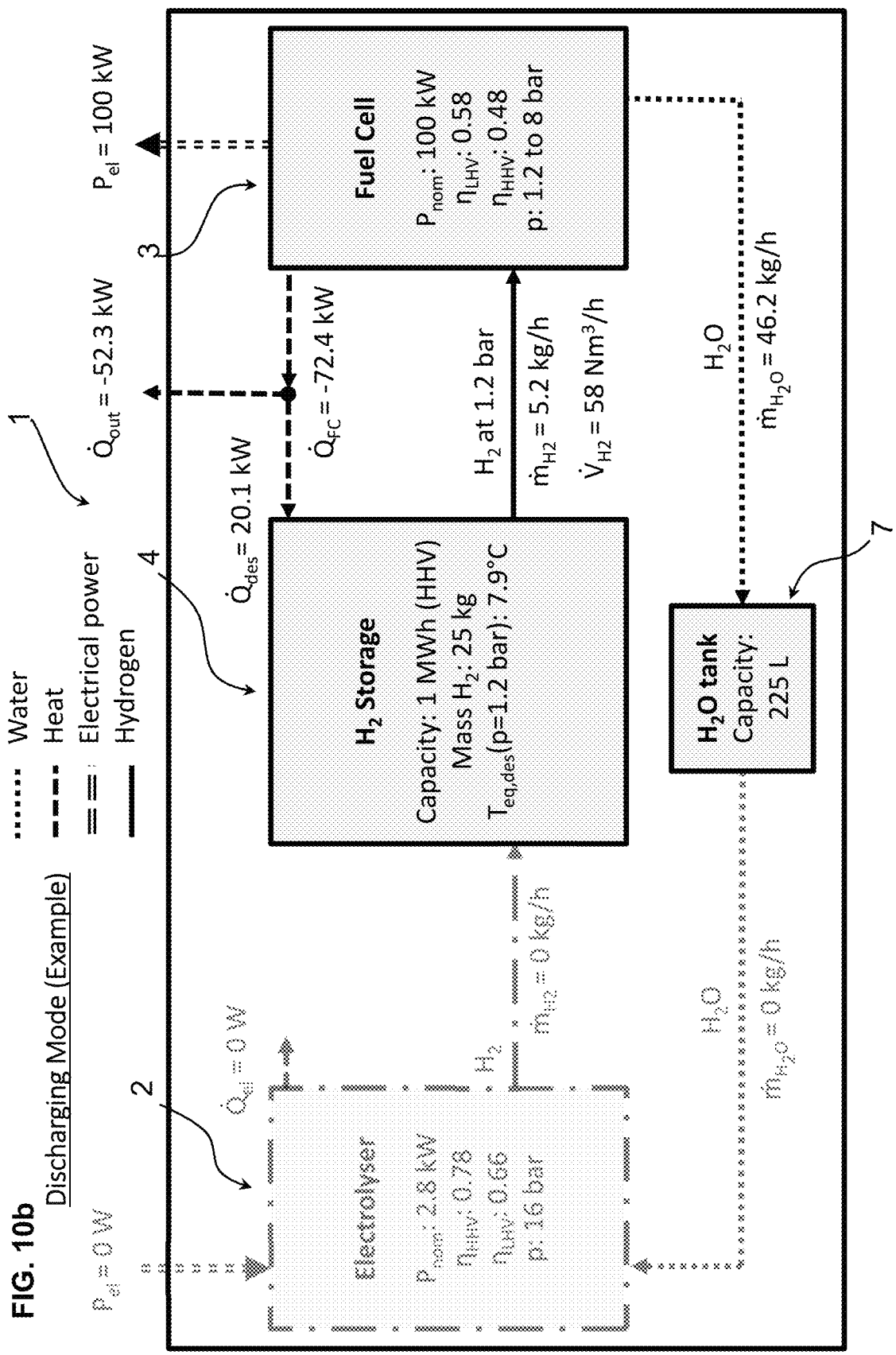
FIG. 10b Discharging Mode (Example)

HYDROGEN STORAGE SYSTEM

CROSS-REFERENCE TO RELATED APPLICATIONS

The present application is a national stage entry of International (PCT) Patent Application Number PCT/EP2020/059860, filed Apr. 7, 2020, which in turn claims priority to European Patent Application No. 19169845.5, filed Apr. 17, 2019, the subject matter of which are expressly incorporated herein by reference.

FIELD OF THE INVENTION

This invention relates to an apparatus and a method for storing hydrogen using metal hydrides.

BACKGROUND OF THE INVENTION

Hydrogen storage is a key step in the decarbonisation of fossil fuel technologies by renewable energy. A variety of storage methods including pressurized gas, hydrogen liquefaction and absorption in solid materials have been considered.

Metal hydrides are of high interest for the storage of hydrogen under low pressures as many metals and alloys are capable of reversibly absorbing significant amounts of hydrogen, whereby a high volumetric density of up 150 kgH$_2$/m$^3$ is reachable.

Molecular hydrogen is dissociated at the surface before absorption. Two H atoms then recombine to H2 upon desorption. The thermodynamic aspects of hydride formation from gaseous hydrogen are described by pressure-composition isotherms as illustrated in FIGS. 1$a$ and 1$b$ which show typical absorption and desorption isotherms of H$_2$ in metal hydrides. The hydrogen absorption reaction in the material is typically exothermic (producing heat) whereas the hydrogen desorption reaction is conversely endothermic (absorbing heat). The low pressure and thermodynamics of metal hydride systems increase the level of safety of the system: in case of a container failure, the hydrogen will be released slowly, the process being thermally limited by the endothermic desorption reaction.

Metal hydride storage systems are thus safe, reliable and compact in comparison to compressed gas or liquefied H$_2$ storage systems. Further, they require minimal maintenance and have a long lifetime.

Metal hydride storages are however characterized by plateau areas where a wide range of concentration is subject to a small or negligible change in pressure as best seen in FIG. 1$c$. Unlike other compressed or liquefied hydrogen storage methods, pressure measurements in the plateau area do not allow an accurate determination of the state of charge of a metal hydride system.

An accurate determination of the state of charge is one of the major limitations for the implementation of the solid absorption in various applications. This is due to the behaviour of most sorption materials. Most isothermal sorption processes are characterized by pressure composition isotherms (pcI) as shown in FIGS. 1$a$ to 1$c$. On one hand, most of the change in the state of charge occurs in a plateau area where there is only a small change of pressure. This is described as a "hard detection of state of charge" in FIG. 1$c$. On the other hand, there are two zones where small changes of charge imply a large change in the pressure of the system, where the system is either close to empty or close to full. This is described in FIG. 1$c$ as the "easy detection of state of charge".

Another challenge of the existing hydrogen storage methods pertains to the limited temperature range of operation. Typical hydrogen storage systems work between a maximal fuelling pressure PF and a minimal hydrogen release pressure PR, where PF>PR. However, the pressure of the sorption system is highly dependent on the temperature. Therefore, the range of operating temperature is limited for each hydrogen storage material by the intrinsic thermodynamic properties of said material, thus limiting its use in many applications where significant temperature gradients occurs such as the seasonal storage or the storage on mobile vehicles.

The fuelling pressure PF can be limited for instance by the type of electrolyser used. The typical pressure delivery of a commercial electrolyser is up 30 bar or slightly beyond. Most devices deliver hydrogen up to 10 to 15 bar. The minimal hydrogen delivery pressure required is dependent on the specific application. In the case for instance of a proton exchange membrane fuel cell (PEMFC), the operating pressure is usually close to atmospheric pressure. The range of operating temperature for a single material is defined by these two pressures.

It is known that different metal hydrides have different operating pressure ranges. This property may be exploited to select the appropriate material for a given application. This property is also exploited in Hydrogen compressors that are used to replenish compressed gas tanks, whereby it is known to have a plurality of different metal hydrides in different tanks that are heated sequentially for desorption such that as the pressure in the compressed gas tank increases, the desorption is performed sequentially from the low pressure metal hydride tank to the high pressure metal hydride tank. Such a system is described in US2005/0003246. It may be noted however that Hydrogen compressors are not well suited for Hydrogen storage in view of the increased volume and cost required for the heating and cooling systems implemented to generate the required outlet pressures and control the system, compared to passive (i.e. non-thermally actuated/unheated) hydrogen storage tanks.

SUMMARY OF THE INVENTION

It is an object of the present invention to provide a hydrogen storage system that is compact, safe and easy to use and maintain.

It is advantageous to provide a hydrogen storage system that has a large temperature operating range.

It is advantageous to provide a hydrogen storage system that is cost effective.

It is advantageous to provide a hydrogen storage system that may be easily implemented in a hydrogen generation system.

It is also an object of the invention to provide a hydrogen generation system with a hydrogen storage system that is compact, safe and easy to use and maintain Objects of this invention have been achieved by providing the hydrogen storage system according to the disclosure.

Objects of this invention have been achieved by providing the hydrogen storage system according to the disclosure.

Disclosed herein is a hydrogen storage system for passive discharge of hydrogen gas without employing heating means, comprising a plurality of hydrogen storage tanks each containing at least one metal hydride (MH) storage material, a hydrogen gas flow circuit connected to the storage tanks and a control system including pressure sensors (P) and temperature sensors (T) arranged for measuring the pressure and temperature in each storage tank. The gas flow circuit comprising valves (V, V1, . . . Vn) coupling said plurality of storage tanks to an inlet, respectively an outlet of the hydrogen storage system, whereby the inlet and outlet may be common or may be separate.

According to a first aspect, at least a first material storage tank comprises a first metal hydride (MH1) of a first composition and at least a second material storage tank comprises a second metal hydride (MH2) of a second composition. The first metal hydride has a temperature operating range from a first minimum operating temperature (TLP1) to first maximum operating temperature (TLP2) corresponding to a pressure operating range from a minimum operating pressure (P2) to a maximum operating pressure (P1), and the second metal hydride having a temperature operating range from a second minimum operating temperature (THP1) to second maximum operating temperature (THP2) corresponding to said pressure operating range from said minimum operating pressure (P2) to said maximum operating pressure (P1), whereby the first maximum operating temperature (TLP2) is greater than the second maximum operating temperature (THP2) and the second minimum operating temperature (THP1) is lower than said first minimum operating temperature (TLP1). The second maximum operating temperature is greater than said first minimum operating temperature (THP2>TLP1). The first and second storage tanks are coupled together in parallel via at least one valve arranged to switch between the first and second material storage tanks depending on the inlet or outlet pressure in a manner to operate charging and discharging of the storage system from the second minimum operating temperature (THP1) to the first maximum operating temperature (TLP2) corresponding to a pressure operating range from the minimum operating pressure (P2) to the maximum operating pressure (P1).

According to a second aspect, the plurality of storage tanks comprise storage tanks that are coupled to the inlet, respectively the outlet of the hydrogen storage system each via a corresponding dedicated valve, the valves of different storage tanks opening, respectively closing at different pressures, operable to fill said storage tanks in a sequence of their corresponding valve opening pressures, and to empty said storage tanks in a sequence of their corresponding valve closing pressures. The control system is configured to compute the state of charge of the hydrogen storage system based on a ratio of the sum of the storage tanks measured as full or measured as empty, with respect to the total number of storage tanks.

In an advantageous embodiment, actuation of the valves is controlled by an electrical/electronic control system.

In an advantageous embodiment, the valves are electrically actuated valves, preferably electromagnetic valves.

In another embodiment, the valves may be mechanical pressure release valves connected to each storage tank, the pressure release valves of each storage tank being calibrated at a different opening pressure in order to actuate at different pressures.

In an advantageous embodiment, the control system is configured to compute the state of charge of each individual said storage tank as empty if the pressure measurement of said storage tank is less than 10% of a minimum defined storage pressure (Pmin) and as full if the pressure measurement of said storage tank is more than 90% of a maximum defined storage pressure (Pmax).

In an advantageous embodiment, the control system is configured to compute the state of charge of each individual said storage tank as half full if the pressure measurement of said storage tank is between said 10% of the minimum defined storage pressure (Pmin) and 90% of the maximum defined storage pressure (Pmax).

In an advantageous embodiment, the pressure sensors comprise at least one pressure sensor mounted on the inlet, respectively outlet of each storage tank.

The temperature sensors may comprise at least one temperature sensor inserted in a core tube extending into a container of each storage tank, hermetically sealed from an inside of said container.

In an advantageous embodiment, the first and second material storage tanks are combined into groups of storage tanks configured to be filled and emptied in a sequential order of said groups, the valves of different groups of storage tanks opening, respectively closing at different pressures, operable to fill said groups of storage tanks in a sequence of their corresponding valve opening pressures, and to empty said groups of storage tanks in a sequence of their corresponding valve closing pressures, the control system configured to compute the state of charge of the hydrogen storage system based on a ratio of the sum of the storage tanks measured as full or measured as empty, with respect to the total number of storage tanks.

In an advantageous embodiment, the valves of different groups of storage tanks are operable to fill said groups of storage tanks in sequence with the priority of filling first the storage tank with the higher operating pressure and to empty said groups of storage tanks in sequence with the priority of emptying first the storage tank with the lower operating pressure, whereas if several valves are open at the same time during the charge of the storage, the tank with the higher pressure is full and cannot absorb more hydrogen and if several valves are open at the same time during the discharge, the tank with the lower pressure is empty.

In an advantageous embodiment, each group is a pair constituted by one first material storage tank and one second material storage tank.

In an advantageous embodiment, the first metal hydride (MH1) comprises or consists principally in a metallic alloy of the family $AB_5$-type where A is Lanthanum which can be partially substituted with Cerium, neodymium and/or praseodymium and B is Nickel which can be partially substituted with at least one component or a plurality of components selected from the group consisting of Cobalt, Aluminium, Manganese and Iron.

In an advantageous embodiment, the first metal hydride (MH1) comprises or consists principally in $LaNi_5$ and optionally additional elements selected from a group consisting of Ce, Co, Mn.

In an advantageous embodiment, the first metal hydride (MH1) is of $AB_5$-type, wherein the proportions of Lanthanum varies from 0.5 to 1 and Ni is not substituted.

In an advantageous embodiment, the first metal hydride (MH1) comprises or consists principally in a metallic alloy of the family $AB_2$-type where A is Titanium which may or may not be partially substituted with Zirconium and B includes a plurality of components selected from the group consisting of Vanadium, Manganese, Iron, Cobalt and Nickel.

In an advantageous embodiment, the first metal hydride (MH1) comprises or consists principally in $ZrV_2$, and optionally additional elements selected from a group consisting of Chromium, Manganese and Cobalt.

In an advantageous embodiment, the second metal hydride (MH2) comprise or consist in a metallic alloy of the family $AB_5$-type where A is Lanthanum which can be partially substituted with Cerium, neodymium and/or praseodymium and B is Nickel which can be partially substituted with at least one component or a plurality of components selected from the group consisting of Cobalt, Aluminum, Manganese and Iron.

In an advantageous embodiment, the second metal hydride (MH2) is of $AB_5$-type, wherein the proportions of Lanthanum varies from 0.9 to 1 and Ni is not substituted.

In an advantageous embodiment, the first and second metal hydrides (MH1 and MH2) are from the same family of metal hydrides.

In an advantageous embodiment, the first metal hydride (MH1) is $La_{0.5}Ce_{0.5}Ni_5$ and the second metal hydride (MH2) is $La_{0.9}Ce_{0.1}Ni_5$.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which:

FIGS. 1a to 1c are schematic graphical representations of pressure-composition isotherms of a metal hydride;

FIG. 2 is a schematic view of a hydrogen storage system according to an embodiment of the invention;

FIG. 3 is a schematic view of a hydrogen storage tank of a hydrogen storage system according to an embodiment of the invention;

FIG. 4 is a schematic view of a variant of the hydrogen storage system of FIG. 2;

FIG. 5 is a schematic view of a hydrogen storage system according to another embodiment of the invention;

FIG. 6 is a schematic view of a hydrogen storage system according to yet another embodiment of the invention;

FIGS. 7a and 7b are Van't Hoff plots [pressure (log n) versus inverse temperature (1/T) characteristic] of a first (high pressure) metal hydride, respectively a second (low pressure) metal hydride hydrogen storage material;

FIG. 7c is a combined plot of the first and second materials;

FIGS. 10a and 10b are schematic diagrams illustrating an example of process values in a charging mode, respectively a discharging mode of a hydrogen generation system according to an embodiment of the invention;

DETAILED DESCRIPTION OF EMBODIMENTS OF THE INVENTION

Figure 8A:
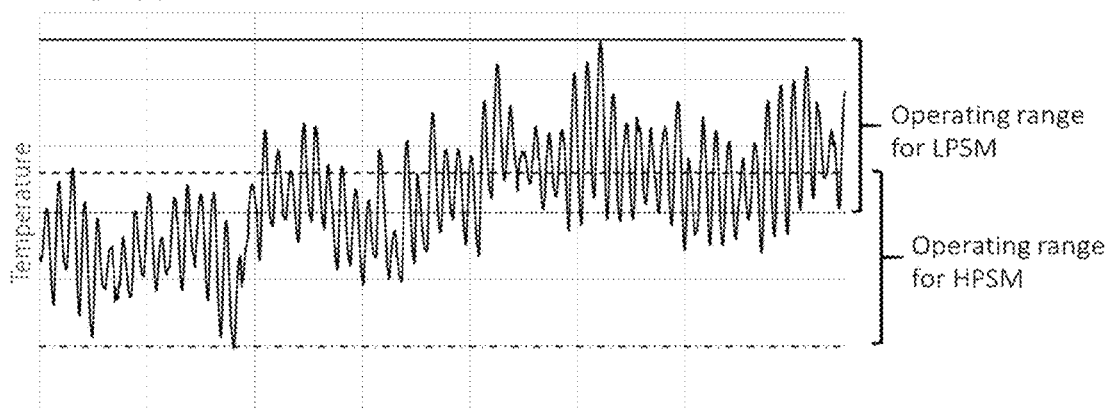
FIGS. 8a and 8b are plots of fluctuating temperatures over time and corresponding operating ranges for the low-pressure storage material and the high pressure storage material.

Referring to the figures, a hydrogen generation system 1 comprises a hydrogen storage system 4 connected to a hydrogen source such as a hydrogen generator 2. The hydrogen generator 2 may in particular be an electrolyser that splits water into hydrogen gas and oxygen gas. The electrolyser may in particular be connected to a source of renewable energy, in particular solar energy. The hydrogen generation system 1 may further comprise a hydrogen consumer such as an electrical power generator 3, for instance in the form of hydrogen fuel cells, to produce electricity from hydrogen gas, and optionally a water tank 7 to store water for the electrolyser 2 and/or to recover water output by the fuel cells 3.

Figure 10A:
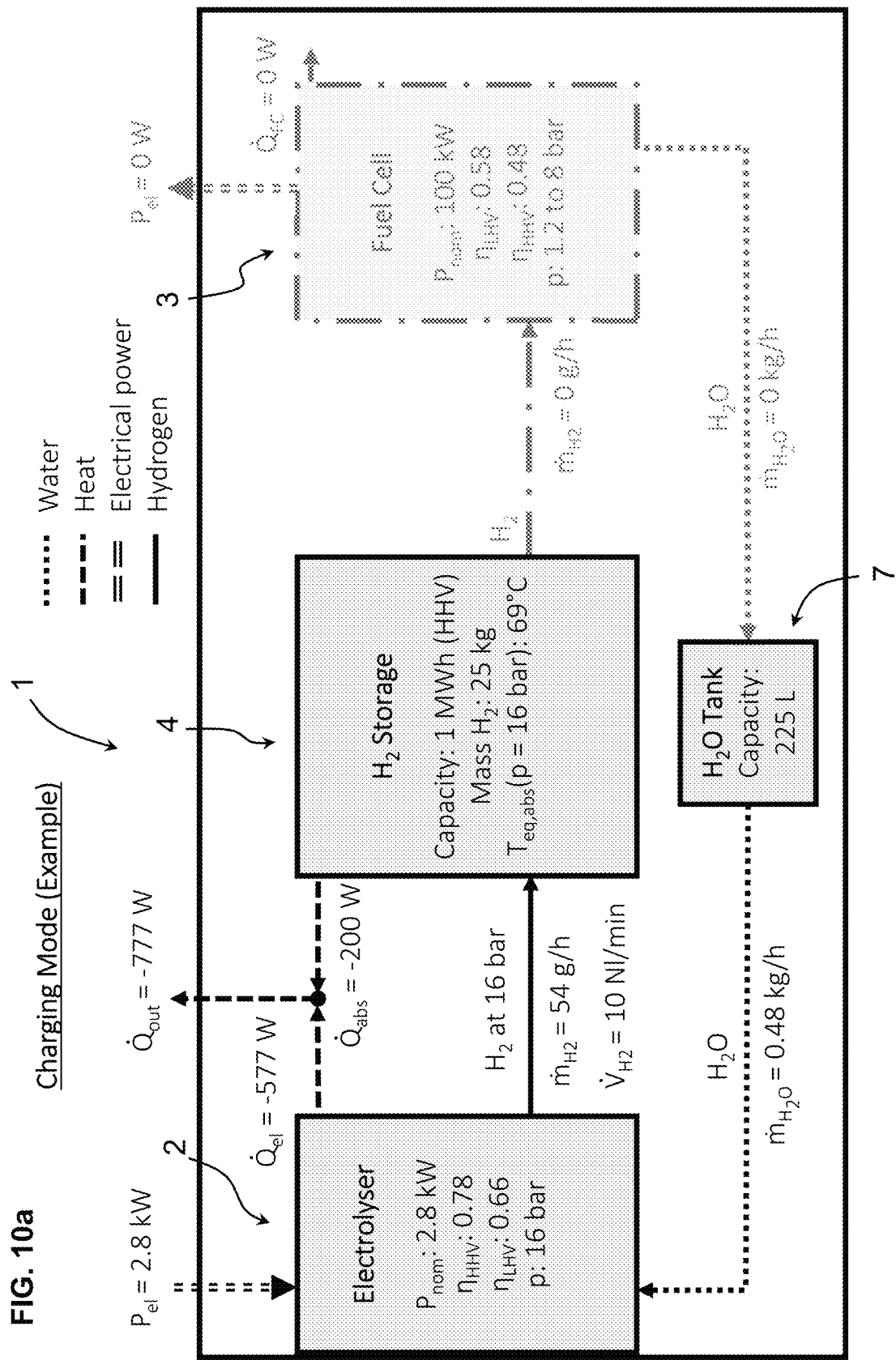
Figure 11:
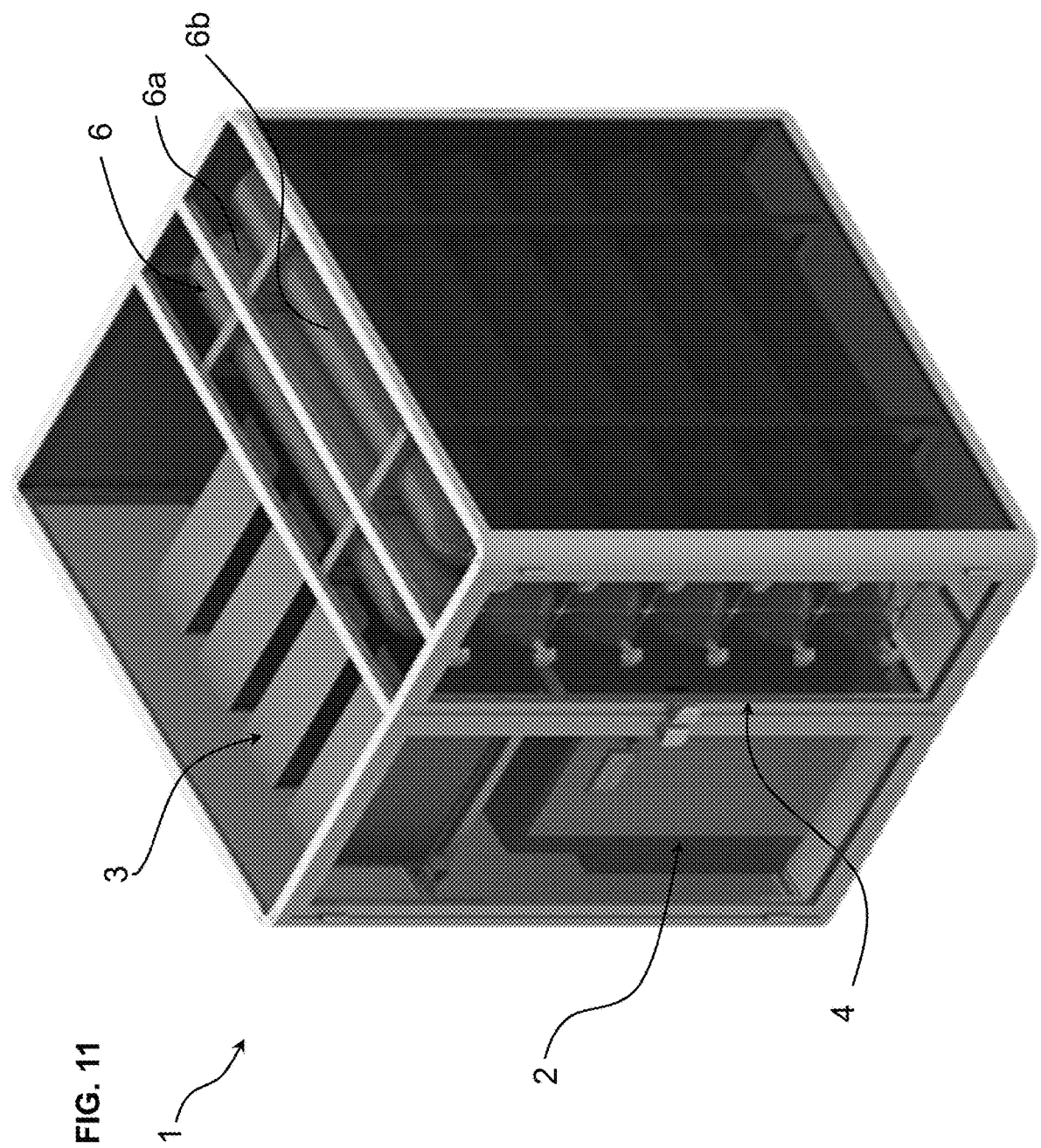
FIG. 11 is a perspective view of a hydrogen generation system according to an embodiment of the invention.

In the configuration illustrated in FIGS. 10a, 10b and 11, the hydrogen generation system 1 may be used as a means for converting solar energy captured by photovoltaic panels into hydrogen gas serving as a fuel that stores the captured energy, which may be reconverted into electrical power. Thus, the hydrogen storage system may act as a buffer between solar energy supply and electrical power demand. The hydrogen storage system 4 may however be implemented in other applications, for instance for supplying hydrogen in gaseous or liquefied form for various mobile or static applications. The storage system may thus be coupled to a hydrogen compressor that feeds compressed hydrogen gas tanks for various mobile and industrial applications.

The electrolyser 2 and the hydrogen storage system 4 may also be provided as a separate units connected together with a fluid coupling circuit.

The maximum pressure of the hydrogen gas output by a typical electrolyser is for instance in a range of 10 to 20 bars. This electrolyser output pressure thus constitutes the pressure of the hydrogen gas input into the hydrogen storage system 4. If the hydrogen storage system 4 is connected to a power generator 3 in a form of fuel cells, the pressure input of hydrogen gas into the fuel cell is typically in a range of just over 1 bar to 10 bars, for instance in a range of 1.2 to 8 bars. The hydrogen gas output pressure of the hydrogen storage system is thus typically in a range of just of 1.2 bars to 10 bars, but in certain applications can rise up to about 50 bars depending on the type of metal hydride material used in the storage tank.

If hydrogen from the hydrogen storage system needs to be filled in vessels as compressed hydrogen gas or liquefied hydrogen, then a compression system for the hydrogen gas output from the storage system 4 is required, which may for instance be in a form of a metal hydride tank compression system as per se known.

In the present invention, the hydrogen storage system 4 is passive, in the sense that it does not have heating means to raise the pressure of the hydrogen gas during the desorption process. The hydrogen storage system may however have a heat exchanger system between tanks to allow heat generated by exothermic processes in certain tanks to transfer to other tanks, or to be evacuated from the system by natural convection or forced convection. Heat exchangers may be mounted between individual tanks of the hydrogen storage system in order to improve the exchange of heat between tanks of the hydrogen storage system.

The hydrogen storage system 4 according to the invention comprises a plurality of storage tanks 6 connected to a gas flow circuit 8 and a control system comprising at least pressure sensors P and temperature sensors T. The gas flow circuit comprises valves V, V1, V2, V3 . . . Vn connected to the storage tanks 6, each of the storage tanks comprising at least one valve to enable individual control of gas into and out of the storage tank, separately controlled with respect to the other tanks.

The gas circuit may comprise an $H_2$ inlet circuit 8a and an $H_2$ outlet circuit 8b, the inlet circuit comprising at least a hydrogen inlet 10 and the outlet circuit 8b comprising at least a hydrogen outlet 12. It may however be noted that each tank 6 may comprise separate inlet 10 and outlet 12, however a single connection 10,12 to a tank may be provided that acts as both the inlet and the outlet.

As best illustrated in FIG. 2, the hydrogen outlet 12 and inlet 10 may be coupled to the plurality of storage tanks 6 through a valve Vio, for instance a threeway valve Vio that allows to selectively switch the storage tanks coupling to the inlet 10, the outlet 12, and optionally a third position in which both the inlet and outlet are closed.

An embodiment illustrated in FIGS. 4 to 6, the storage tanks may have dedicated inlet circuit and corresponding valves separate from a dedicated outlet circuit and corresponding valves. In this way the inlet and outlet can be opened simultaneously in order to allow a through flow of hydrogen gas from the hydrogen generator 2 to the outlet.

In an advantageous embodiment, the valves may be in a form of electromagnetic valves that are opened and closed by an electrical control system depending on the state of operation of the system. The valves may also be actuated by other types of electrical actuators (e.g. a linear motor), or by hydraulic or pneumatic systems, controlled by the control system. The system 1 may be in a charging mode as illustrated in FIG. 10a, or in a discharging mode as illustrated in FIG. 10b, or at a state of rest. Each of the storage tanks 6 is filled with a metal hydride. The metal hydride may be in the form of loose particles or grains that fill the volume of the container preferably more that 70%. The metal hydrides particles may typically have an average diameter in the range of approximately 1 to 10 mm and upon hydrogenation the metal hydrides particles typically may have an average diameter in the range of 5 to 10 micrometers as per se known in the field of hydrogen storage metal hydride materials.

Each storage tank comprises at least one temperature sensor T configured to measure the temperature within the storage tank. In an embodiment, the temperature sensor may be mounted within a hermetically sealed core tube 9 extending into the container of the storage tank. The core tube 9 may for instance be a closed end tube inserted within the center of the storage tank and welded to an orifice at an end face of the tank container wall. The tank 6 may in particular have a cylindrical form. In a variant (not shown) it is however possible to mount a temperature sensor within the tank inserted through the inlet or outlet port 11 and attached to a cap of the inlet and outlet port.

Each hydrogen storage tank further comprises a pressure sensor P which may be mounted on the common inlet/outlet 11 or on both the inlet 11a and outlet 11b if the inlet and outlet are separate, to measure the gas of the inlet and outlet of the storage tank, the pressure sensor being mounted between the storage tank valve V1 ... Vn and the tank 6. Pressure sensors of various types may be used as per se known in the art of gas pressure sensing.

The pressure and temperature sensors allow to determine the state of charge with reference to the relevant pressure-composition isothermal curve during the absorption and desorption processes.

According to an aspect of the invention, the plurality of storage tanks are fillable with hydrogen gas in a sequential manner, and dischargeable in an inverse sequential manner, in order to improve the determination of the state of charge of the storage system 4. As best seen in the pressure-composition isotherm illustrated in FIG. 1c, the gradient of variation of pressure as a function of the state of charge is very high when the storage tank is at a nearly empty or nearly full state, but in a large band therebetween has a very small slope that makes it very difficult to determine the state of charge. By connecting a plurality of tanks configured to fill and empty in a sequential manner, whereby a subsequent storage tank 6 is filled, respectively emptied, only once the current tank in operation is full, respectively empty, the full and empty states being easily measurable as mentioned above.

Figure 9:
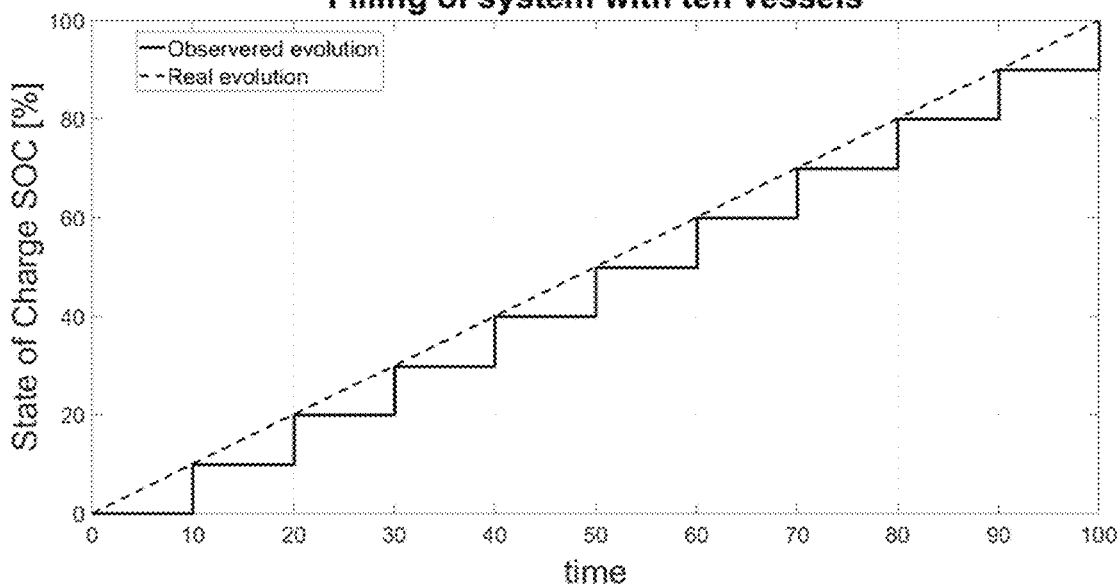
FIG. 9 is a plot illustrating the evolution of the state of charge over time during the filling process using a ten vessel system according to an embodiment of the invention.

The control system may receive measurement signals from the pressure and temperature sensors P, T of each tank and control the electromagnetic valves V1 ... Vn to open and close in sequence based on the temperature and pressure measurements indicating the full and empty state. As best seen in FIG. 9, if there are a large plurality of storage tanks (also named vessels), the state of charge can be measured in a stepwise manner, the degree of error being the fraction of one vessel over the total number of vessels in the system.

In a variant, instead of electromagnetic electronically controlled valves V1 ... Vn for each storage tank, it is also possible to implement mechanical pressure release valves connected to each storage tank, the pressure release valves of each storage tank being calibrated at a different opening pressure in order to actuate at different pressures. For instance, the inlet valve of the first tank to be filled will have a valve operating at an inlet pressure that is lower than the subsequent tank to be filled and so on. Therefore, the storage tanks would be filled in a sequence of the valve ascending opening pressures. For the discharging mode, a valve that opens at the lowest pressure is the first empty followed by the tank with the valve at the next pressure level and so on.

According to another aspect of the invention, that is best illustrated in FIGS. 5 and 6, the storage tanks may comprise a low pressure storage tank 6a and a high pressure storage tank 6b connected in parallel via valves V1a, V1b ... Vna, Vnb. Each tank may either each comprise a common inlet and outlet valve, or each tank may comprise a separate inlet valve V1ai, V1bi ... Vnai, Vnbi and a separate outlet valve V1ao, V1bo ... Vnao, Vnbo.

The composition of the metal hydride in the high pressure storage tank 6b is different to the composition of the metal hydride in the low pressure storage tank 6a, in particular having a different operating temperature range as illustrated in FIGS. 7a to 7c. The high pressure storage hydride metal has a temperature operating range from $T_{HP1}$ to $T_{HP2}$ corresponding to a pressure operating range from P1 to P2, and the low pressure storage metal hydride metal has a temperature operating range from $T_{LP1}$ to $T_{LP2}$ corresponding to said pressure operating range from P1 to P2, whereby $T_{LP2}$ is greater than $T_{HP2}$ and $T_{HP2}$ is greater than THP1. Therefore, by combining the two storage tanks with different metal hydride compositions, operation of the storage system 4 over a larger temperature range may be achieved as illustrated with reference to FIGS. 8a to 8b.

When the operating temperature exceeds the maximum operating temperature THP1 of the high pressure storage metal hydride material, the tank containing the low pressure storage metal hydride material is operational, whereas when the operating temperature falls below the minimum operating temperature $T_{LP2}$ of the low pressure storage material, the tank containing the high pressure storage material becomes operational. In between the two values $T_{HP2}$ and $T_{LP1}$ both the tanks 6a, 6b may be operational to charge and discharge.

Figure 8B:
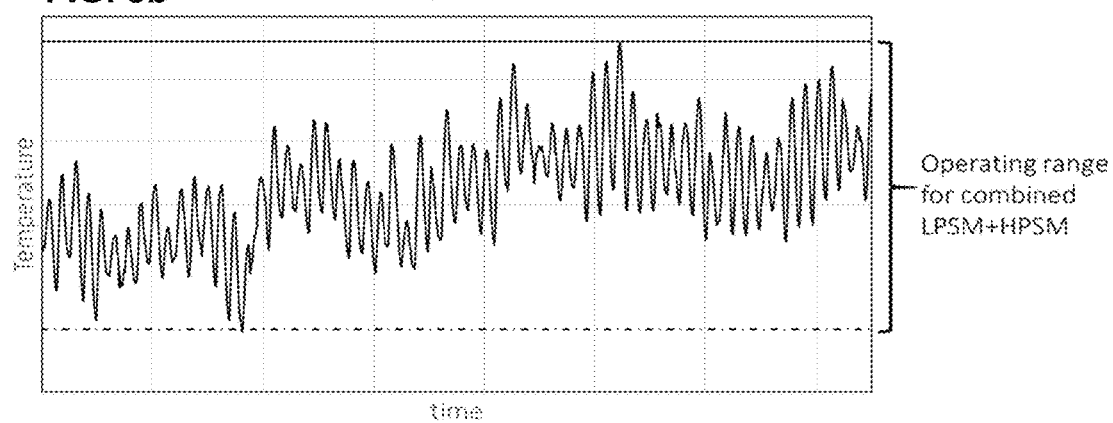

The electromagnetic valves may be operated to open and close the inlets and outlets to the high pressure and low pressure storage tanks as a function of the measured temperature. During charging, the temperature in a tank rises because the charging of the metal hydride with hydrogen is an exothermic process, whereas during the discharging, the tank cools down because the process is endothermic. During charging, the low pressure storage tank 6a will be charged in priority and subsequently the high pressure storage tank 6b. During discharging, the high pressure storage tank will discharge in priority and then the low pressure storage tank. Depending on variations in the operational temperature as illustrated in FIGS. 8a and 8b, which depends not only on the exothermic or endothermic process but also on environmental temperatures around the storage tank, the switching from one tank to the other may occur. The low pressure and high pressure storage tanks mounted in parallel, as illustrated for instance in FIG. 5, may be combined as a plurality of pairs of storage tanks as illustrated in FIG. 6, that are configured to be filled and emptied in a sequential order to enable a better determination of the state of charge as described above. In such a configuration, the low pressure storage tank and high pressure storage tank of a first pair will fill before the low pressure storage tank and high pressure storage tank of the next in sequence fills, and so on, and inversely for the discharging or emptying operation.

The Metal Hydrides (MH) useful in relation with the invention can be selected among the know MH materials based on their temperature operating range (low pressure storage material: LPSM and high pressure storage material: HPSM) such as described in Schlapbach et al., 2001, *Nature,* 414, 353-358; Züttel, 2004, *Naturwissenchaften,* 91: 157-172; Young et al., 2013, *Materials,* 6, 4574-4608 and Lototskyy et al., 2014, *International Journal of Hydrogen Energy,* 39, 11, 5818-5851.

The High-Pressure Storage Material (HPSM) may advantageously comprise or consist principally in a metallic alloy of the family $AB_5$-type where A is Lanthanum which can be partially substituted with Cerium, neodymium and/or praseodymium and B is Nickel which can be partially substituted with at least one component or a plurality of components selected from the group consisting of Cobalt, Aluminum, Manganese and Iron.

According to a particular embodiment, the HPSM is $LaNi_5$. It may advantageously comprise additional elements such as Ce, Co, Mn in different proportions. According to a further particular embodiment, the HPSM is of $AB_5$-type, wherein the proportion of Lanthanum varies from 0.5 to 1.0 and Ni is not substituted.

According to another further particular embodiment, the HPSM is of $AB_5$-type wherein Lanthanum is partially substituted with Co.

In a variant, the HPSM can comprise or consist principally in a metallic alloy of the family $AB_2$-type where A is Titanium which may or may not be substituted or partially substituted with Zirconium and B includes a plurality of components selected from the group consisting of Vanadium, Manganese, Iron, Cobalt and Nickel.

According to another particular embodiment, the HPSM is $ZrV_2$, and optionally additional elements selected from a group consisting of Chromium, Manganese and Cobalt.

The typical equilibrium pressure at ambient temperature (25° C.) for the HPSM is ideally in a range between 5 and 15 bar, but can go up to 50 bar depending on the selected material.

The Low-Pressure Storage Material (LPSM) may advantageously comprise or consist principally in a metallic alloy of the family $AB_5$-type where A is Lanthanum which can be partially substituted with Cerium, neodymium and/or praseodymium and B is Nickel which can be partially substituted with at least one component or a plurality of components selected from the group consisting of Cobalt, Aluminum, Manganese and Iron.

The Low-Pressure Storage Material (LPSM) may advantageously be from the same family of Metal Hydrides as the HPSM.

According to a further particular embodiment, the LPSM is of $AB_5$-type, wherein the proportions of Lanthanum varies from 0.9 to 1 and Ni is not substituted.

The typical equilibrium pressure at ambient temperature (25° C.) for the LPSM is ideally comprised between 1 and 10 bar, but can go up to 50 bar depending on the selected material.

The metal hydride materials MH1, MH2 for the LPSM and HPSM storage tanks 6a, 8b may advantageously be selected according to the following method:
  Define the maximal pressure of refuelling P_max, e.g. the pressure delivered by the electrolyser or the pressure in the hydrogen supply line or the pressure of any other hydrogen source;
  Define the maximal temperature of operation of the system;
  Select the LPSM such that the equilibrium plateau pressure of the material at the maximal operating temperature of the system is as close as possible as the maximal pressure of refuelling, but does not exceed this value;
  Define the minimal pressure required by the hydrogen consumer p_min;
  Calculate the minimal temperature of the system required for the desorption of hydrogen from the LPSM T_min_LPSM while maintaining p_min;
  Select the HPSM such that the pressure of the material at T_min_LPSM is as close as possible to P_max, but does not exceed that value.

Some of the Metal Hydrides that may advantageously be used in embodiments of the invention are presented in Table 1 below, showing their corresponding equilibrium pressure (bar) at 25° C.:

TABLE 1

| | |
|---|---|
| $LaNi_5$ | 1.7 |
| $La_{0.9}Ce_{0.1}Ni_5$ | 2.2 |
| $La_{0.75}Ce_{0.25}Ni_5$ | 3.8 |
| $La_{0.6}Ce_{0.4}Ni_5$ | 5.1 |
| $La_{0.5}Ce_{0.5}Ni_5$ | 8.6 |
| $La_{0.55}Ce_{0.45}Ni_{4.5}M_{0.5}$ | 3.6 |
| $La_{0.50}Ce_{0.50}Ni_{4.5}M_{0.5}$ | 5.7 |

An example of selected materials according to an advantageous embodiment of the invention includes a pair of the following materials:
  HPSM: $La_{0.5}Ce_{0.5}Ni_5$, equilibrium pressure at 25° C.=8.6 bar
  LPSM: $La_{0.9}Ce_{0.1}Ni_5$, equilibrium pressure at 25° C.=2.2 bar.

The typical flow rate (absorption and desorption) of the above material is about 0.5 NL $H_2$/min (normalized liters hydrogen per minute) per kilogram of hydrogen storage material. The flow rate can go up to about 2.5 NL $H_2$/min per kilogram of hydrogen storage material.

The pressure may be measured using a digital or analog pressure sensor P on the inlet/outlet pipe 11 connected to the tank. If several tanks are connected in parallel, a single pressure sensor on the connecting line is sufficient. The temperature is measured within the tank through the core tube 9 which may be in the form of a metallic insert manufactured with the minimal required wall thickness in order to minimize the thermal gradient between the measurement point and the metal hydrides bed within the tank container. A minimum of one temperature measurement point per single tank is required; ideally, the temperature is measured at several locations (e.g. every 100 mm in the length axis of the tank) in order to obtain a more accurate value.

Example of Charging Mode (FIG. 10a)

1. A hydrogen source, for instance an electrolyser 2, connected to the inlet port 11, supplies hydrogen at a supply pressure $P_S$ for instance in a range of 10-20 bars, e.g. 16 bar.

2. The pressure $P_{HP}$ in the high-pressure storage tank 6b is measured by the (inlet) pressure sensor P and compared to the supply pressure $P_S$ by a microprocessor of the electronic control system.

3. If the pressure $P_{HP}$ in the high-pressure storage tank 6b is lower than the supply pressure $P_S$, the high pressure inlet valve V1*bi* is opened by a control command from the control system and the high pressure storage tank 6b is filled.

4. If the pressure $P_{HP}$ in the high-pressure storage tank 6b is higher than the supply pressure $P_S$, the low pressure inlet valve V1*ai* is opened by a command from the control system and the low pressure storage tank 6a is filled. The high pressure inlet valve V1*bi* is closed during this step.

Example of Discharging Mode (FIG. 10b)

1. A hydrogen consumer, for instance a power generator such as a hydrogen fuel cell system, connected to the outlet port 11b, receives hydrogen at a consumer pressure $P_C$ set for instance in a range of 1 to 10 bars, e.g. 1.5 bar.

2. The pressure $P_{LP}$ in the low-pressure storage tank 6a is measured by the (outlet) pressure sensor P and compared to the consumer pressure $P_C$ by the microprocessor of the control system.

3. If the pressure $P_{LP}$ in the low-pressure storage tank 6a is higher than the consumer pressure Pc, the low pressure outlet valve V1*ao* is opened by a command from the control system and the LPSM storage tank 6a is emptied.

4. If the pressure $P_{LP}$ in the low-pressure storage tank 6a is lower than the consumer pressure $P_C$, the high pressure outlet valve V1*bo* is opened by a command from the control system and the HPSM storage tank 6b is emptied. The low pressure outlet valve V1*ao* is closed during this step.

Example of the Determination of the State of Charge (FIG. 9)

1. The temperature in at least the storage tank(s) 6, 6a, 6b currently being charged or discharged is measured and the measurement transmitted to the control system. If several temperature points are taken, the average is calculated by the microprocessor of the electronic control system and used as the temperature measurement value.

2. The pressure in said at least the storage tank(s) 6, 6a, 6b currently being charged or discharged is measured and the measurement transmitted to the control system.

3. The pressure-temperature measurement couple is compared by the microprocessor of the control system with an internal database of Pressure Concentration Isotherm (pcI) plots (for instance as shown in FIGS. 1a, 1b, 1c) stored in a memory of the control system.

4. For a given temperature, a domain of pressure Pmin<P<Pmax is defined, as shown in FIG. 1c.

5. From the above information, the following charge states of the corresponding storage tank may be set in the control system:

a. P<Pmin: the Tank is considered less than 10% full and set to "empty" in a charge state register of memory of the control system.
b. Pmin<P<Pmax: the tank is considered half-full and set for instance as 50% full in the charge state register in the control system.
c. Pmax<P: the tank is considered more than 90% and set to "full" in the charge state register of the control system.

6. This procedure may be repeated in a given interval, e.g. every 10 seconds or once per minute.

7. Preferably the above steps are performed for each (i.e. all) of the storage tanks, not only the storage tank currently being charged or discharged. However since the storage tanks may be charged, respectively discharge in a sequential manner. The measurement procedure does not necessarily need to be performed on all storage tanks at the same time or at the same intervals, the state of charge of the completely full or completely empty tanks that are closed and not under current operation being known and recorded in the charge register of the control system. Nevertheless, for reliability, it is preferable to measure the state of charge of all storage tanks on a regular interval such as mentioned above (e.g. every 10 seconds).

8. Based on the above mentioned settings recorded in the charge state register, the state of charge of the overall system may be calculated by the microprocessor of the control system with an accuracy of (1/N)*100%, where N is the number of storage tanks 6, 6a, 6b. For instance, a system with ten storage tanks can determine the state of charge of the system with an accuracy of about 10%.

LIST OF REFERENCES USED

Hydrogen generation system 1
  Hydrogen source
    Hydrogen generator 2
      e.g. Electrolyser
  Hydrogen consumer
    Power generator 3
      e.g. Fuel cell
  Water tank 7
  Hydrogen storage system 4
    Storage tanks 6
      Low pressure storage tank 6a
      High pressure storage tank 6b
      Core tube 9
      Outlet 11
      Metal Hydride MH
    H2 gas flow circuit 8
      H2 inlet circuit 8a
        H2 inlet 10
      H2 outlet circuit 8b
        H2 outlet 12
      Valves V, V1, V2, V3 . . . Vn
    Control system
      Pressure sensors P
      Temperature sensors T
      Electrovalve control

The invention claimed is:

1. Hydrogen storage system comprising a plurality of hydrogen storage tanks each containing at least one metal hydride (MH) storage material, a hydrogen gas flow circuit connected to the storage tanks and a control system including pressure sensors (P) and temperature sensors (T) arranged for measuring the pressure and temperature in each storage tank, the gas flow circuit comprising valves (V, V1, ... Vn) coupling said plurality of storage tanks to an inlet, respectively an outlet of the hydrogen storage system, whereby the inlet and outlet may be common or may be separate, wherein at least a first hydrogen storage tank comprises a first metal hydride (MH1) of a first composition and at least a second hydrogen storage tank comprises a second metal hydride (MH2) of a second composition, said first metal hydride having a temperature operating range from a first minimum operating temperature ($T_{LP1}$) to first maximum operating temperature ($T_{LP2}$) corresponding to a pressure operating range from a minimum operating pressure (P2) to a maximum operating pressure (P1), and said second metal hydride having a temperature operating range from a second minimum operating temperature ($T_{HP1}$) to second maximum operating temperature ($T_{HP2}$) corresponding to said pressure operating range from said minimum operating pressure (P2) to said maximum operating pressure (P1), whereby the first maximum operating temperature is greater than the second maximum operating temperature ($T_{LP2}>T_{HP2}$), the second minimum operating temperature is lower than said first minimum operating temperature ($T_{HP1}<T_{LP1}$), and the second maximum operating temperature is greater than said first minimum operating temperature ($T_{HP2}>T_{LP1}$), the first and second storage tanks being coupled together in parallel via at least one valve (Vnai, Vnbi, Vnao, Vnbo) arranged to switch between the first and second hydrogen storage tanks (6a, 6b) depending on the inlet or outlet pressure in a manner to operate charging and discharging of the storage system from the second minimum operating temperature ($T_{HP1}$) to the first maximum operating temperature ($T_{LP2}$) corresponding to a pressure operating range from the minimum operating pressure (P2) to the maximum operating pressure (P1).

2. Hydrogen storage system according to claim 1, wherein actuation of the valves is controlled by an electrical control system.

3. Hydrogen storage system according to claim 2, wherein the valves are electromagnetic valves.

4. Hydrogen storage system according to claim 1, wherein the valves are mechanical pressure release valves connected to each storage tank, the pressure release valves of each storage tank being calibrated at a different opening pressure in order to actuate at different pressures.

5. Hydrogen storage system according to claim 1, wherein the first and second hydrogen storage tanks are combined into groups of storage tanks configured to be filled and emptied in a sequential order of said groups, the valves of different groups of storage tanks opening at different pressures exerted on the valves by said hydrogen gas flow circuit (valve opening pressure), respectively closing at different pressures exerted on the valves by said hydrogen gas flow circuit (valve closing pressure), operable to fill said groups of storage tanks in a sequence of their corresponding valve opening pressures, and to empty said groups of storage tanks in a sequence of their corresponding valve closing pressures, the control system configured to compute the state of charge of the hydrogen storage system based on a ratio of the sum of the storage tanks measured as full or measured as empty, with respect to the total number of storage tanks.

6. Hydrogen storage system according to claim 5, wherein the valves of different groups of storage tanks are operable to fill said groups of storage tanks in sequence with the priority of filling first the storage tank with the higher operating pressure and to empty said groups of storage tanks in sequence with the priority of emptying first the storage tank with the lower operating pressure, whereas if several valves are open at the same time during the charge of the storage, the tank with the higher pressure is full and cannot absorb more hydrogen and if several valves are open at the same time during the discharge, the tank with the lower pressure is empty.

7. Hydrogen storage system according to claim 6, wherein each group is a pair constituted by one first hydrogen storage tank and one second hydrogen storage tank.

8. Hydrogen storage system according to claim 1, wherein the first metal hydride (MH1) comprises or consists principally in a metallic alloy of the family $AB_5$-type where A is Lanthanum which can be partially substituted with Cerium, neodymium and/or praseodymium and B is Nickel which can be partially substituted with at least one component or a plurality of components selected from the group consisting of Cobalt, Aluminum, Manganese and Iron.

9. Hydrogen storage system according to claim 1, wherein the first metal hydride (MH1) comprises or consists principally in $LaNi_5$ and optionally additional elements selected from a group consisting of Ce, Co, Mn.

10. Hydrogen storage system according to claim 1, wherein the first metal hydride (MH1) is of $AB_5$-type, wherein the proportions of Lanthanum varies from 0.5 to 1 and Ni is not substituted.

11. Hydrogen storage system according to claim 1, wherein the first metal hydride (MH1) comprises or consists principally in a metallic alloy of the family $AB_2$-type where A is Titanium which may or may not be partially substituted with Zirconium and B includes a plurality of components selected from the group consisting of Vanadium, Manganese, Iron, Cobalt and Nickel.

12. Hydrogen storage system according to claim 1, wherein the first metal hydride (MH1) comprises or consists principally in $ZrV_2$, and optionally additional elements selected from a group consisting of Chromium, Manganese and Cobalt.

13. Hydrogen storage system according to claim 1, wherein the second metal hydride (MH2) comprise or consist in a metallic alloy of the family $AB_5$-type where A is Lanthanum which can be partially substituted with Cerium, neodymium and/or praseodymium and B is Nickel which can be partially substituted with at least one component or a plurality of components selected from the group consisting of Cobalt, Aluminum, Manganese and Iron.

14. Hydrogen storage system according to claim 1, wherein the second metal hydride (MH2) is of $AB_5$-type, wherein the proportions of Lanthanum varies from 0.9 to 1 and Ni is not substituted.

15. Hydrogen storage system according to claim 1, wherein the first metal hydride (MH1) is $La_{0.5}Ce_{0.5}Ni_5$ and the second metal hydride (MH2) is $La_{0.9}Ce_{0.1}Ni_5$.

16. Hydrogen storage system comprising a plurality of hydrogen storage tanks each containing at least one metal hydride (MH) storage material, a hydrogen gas flow circuit connected to the storage tanks and a control system including pressure sensors (P) and temperature sensors (T) arranged for measuring the pressure and temperature in each storage tank, the gas flow circuit comprising valves (V, V1, . . . Vn) coupling said plurality of storage tanks to an inlet, respectively an outlet of the hydrogen storage system, whereby the inlet and outlet may be common or may be separate, wherein the plurality of storage tanks comprise storage tanks coupled to said inlet, respectively said outlet of the hydrogen storage system each via a corresponding dedicated valve (Vn), the valves of different storage tanks opening at different pressures exerted on the valves by said hydrogen gas flow circuit (valve opening pressure), respectively closing at different pressures exerted on the valves by said hydrogen gas flow circuit (valve closing pressure), operable to fill said storage tanks in a sequence of their corresponding valve opening pressures, and to empty said storage tanks in a sequence of their corresponding valve closing pressures, the control system configured to compute the state of charge of the hydrogen storage system based on a ratio of the sum of the storage tanks measured as full or measured as empty, with respect to the total number of storage tanks.

17. Hydrogen storage system according to claim 16, wherein the control system is configured to compute the state of charge of each individual said storage tank as empty if the pressure measurement of said storage tank is less than 10% of a minimum defined storage pressure (Pmin) and as full if the pressure measurement of said storage tank is more than 90% of a maximum defined storage pressure (Pmax).

18. Hydrogen storage system according to claim 17, wherein the control system is configured to compute the state of charge of each individual said storage tank as half full if the pressure measurement of said storage tank is between said 10% of the minimum defined storage pressure (Pmin) and 90% of the maximum defined storage pressure (Pmax).

19. Hydrogen storage system according to claim 16, wherein said temperature sensors comprise at least one temperature sensor inserted in a core tube extending into a container of each storage tank, hermetically sealed from an inside of said container.

20. Hydrogen storage system according to claim 16, wherein said pressure sensors comprise at least one pressure sensor mounted on the inlet, respectively outlet of each storage tank.

21. Hydrogen storage system according to claim 16, wherein actuation of the valves is controlled by an electrical control system.

22. Hydrogen storage system according to claim 16, wherein the valves are electromagnetic valves.

23. Hydrogen storage system according to claim 16, wherein the valves are mechanical pressure release valves connected to each storage tank, the pressure release valves of each storage tank being calibrated at a different opening pressure in order to actuate at different pressures.

24. Hydrogen storage system according to claim 16, wherein at least a first hydrogen storage tank comprises a first metal hydride (MH1) of a first composition and at least a second hydrogen storage tank comprises a second metal hydride (MH2) of a second composition, said first metal hydride having a temperature operating range from a first minimum operating temperature ($T_{LP1}$) to first maximum operating temperature ($T_{LP2}$) corresponding to a pressure operating range from a minimum operating pressure (P2) to a maximum operating pressure (P1), and said second metal hydride having a temperature operating range from a second minimum operating temperature ($T_{HP1}$) to second maximum operating temperature ($T_{HP2}$) corresponding to said pressure operating range from said minimum operating pressure (P2) to said maximum operating pressure (P1), whereby the first maximum operating temperature is greater than the second maximum operating temperature ($T_{LP2} > T_{HP2}$), the second minimum operating temperature is lower than said first minimum operating temperature ($T_{HP1} < T_{LP1}$), and the second maximum operating temperature is greater than said first minimum operating temperature ($T_{HP2} > T_{LP1}$).

25. Hydrogen storage system according to claim 24, wherein said first and second hydrogen storage tanks are coupled together in parallel via at least one valve (Vnai, Vnbi, Vnao, Vnbo) arranged to switch between the first and second hydrogen storage tanks (6a, 6b) depending on the inlet or outlet pressure in a manner to operate charging and discharging of the storage system from the second minimum operating temperature ($T_{HP1}$) to the first maximum operating temperature ($T_{LP2}$) corresponding to a pressure operating range from the minimum operating pressure (P2) to the maximum operating pressure (P1).

* * * * *